United States Patent
Chang et al.

(10) Patent No.: US 8,375,245 B2
(45) Date of Patent: Feb. 12, 2013

(54) MOBILITY MANAGEMENT ENTITY FAILOVER

(75) Inventors: Patricia Ruey-Jane Chang, San Ramon, CA (US); Vikram Rawat, San Ramon, CA (US); Maria G. Lam, Oakland, CA (US); Sagiv Draznin, Walnut Creek, CA (US); Steven R. Rados, Danville, CA (US); Scott Anthony Townley, Gilbert, AZ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 249 days.

(21) Appl. No.: 12/837,005

(22) Filed: Jul. 15, 2010

(65) Prior Publication Data

US 2012/0023360 A1   Jan. 26, 2012

(51) Int. Cl.
*G06F 11/00* (2006.01)
(52) U.S. Cl. ........... 714/4.11; 370/221; 714/4.2; 714/55
(58) Field of Classification Search ............. 370/221; 714/4.11, 4.2, 55
See application file for complete search history.

(56) References Cited

U.S. PATENT DOCUMENTS

| | | | |
|---|---|---|---|
| 8,145,195 B2 * | 3/2012 | Forsberg et al. | 455/411 |
| 2009/0046655 A1 * | 2/2009 | Zhao et al. | 370/331 |
| 2009/0201933 A1 * | 8/2009 | Chai | 370/395.31 |
| 2010/0103862 A1 * | 4/2010 | Ulupinar et al. | 370/315 |
| 2010/0124933 A1 * | 5/2010 | Chowdhury et al. | 455/453 |
| 2010/0220656 A1 * | 9/2010 | Ramankutty et al. | 370/328 |
| 2010/0255808 A1 * | 10/2010 | Guo et al. | 455/404.1 |
| 2010/0268981 A1 * | 10/2010 | Xiang | 714/2 |
| 2010/0299419 A1 * | 11/2010 | Ramankutty et al. | 709/221 |
| 2010/0322151 A1 * | 12/2010 | Racz et al. | 370/328 |
| 2011/0107169 A1 * | 5/2011 | Lohr et al. | 714/748 |
| 2011/0122845 A1 * | 5/2011 | Meirosu et al. | 370/332 |
| 2011/0205900 A1 * | 8/2011 | Zhang | 370/237 |
| 2011/0235505 A1 * | 9/2011 | Eswara et al. | 370/221 |
| 2011/0292913 A1 * | 12/2011 | Wu | 370/331 |
| 2012/0002537 A1 * | 1/2012 | Bao et al. | 370/221 |
| 2012/0005523 A1 * | 1/2012 | Korhonen et al. | 714/4.11 |
| 2012/0069733 A1 * | 3/2012 | Ye et al. | 370/221 |
| 2012/0076099 A1 * | 3/2012 | Yin et al. | 370/329 |
| 2012/0094656 A1 * | 4/2012 | Huang et al. | 455/423 |

* cited by examiner

*Primary Examiner* — Joshua P Lottich

(57) ABSTRACT

A method, performed by a first mobility management entity (MME) device in a network, includes receiving, from a second MME device, standby database information associated with user equipment (UE) registered with the second MME device; detecting that the second MME device has failed or lost connectivity; designating that the UEs registered with the second MME device will be registered with the first MME device, in response to detecting that the second MME device has failed or lost connectivity; detecting a request to activate a particular UE registered with the second MME device; and paging the particular UE to register with the first MME device, using the standby database information and in response to detecting the request to activate the particular UE.

20 Claims, 12 Drawing Sheets

MOBILITY MANAGEMENT ENTITY FAILOVER

BACKGROUND INFORMATION

Wireless communication networks continue to increase in popularity, leading to increasing numbers of users and to demands for additional services. The increasing numbers of users and implementation of new services result in increased network complexity and drive the development of new standards. The Long Term Evolution (LTE) standard, developed by the Third Generation Partnership Project (3GPP), aims to increase the capacity and speed of wireless communication networks. A main component of the network architecture specified by the LTE standard is the Evolved Packet Core (EPC) network. An EPC network may include nodes and functions that provide Internet Protocol (IP) connectivity to user equipment (UE) for data, voice, and multimedia services. The design of an EPC network may attempt to minimize the number of nodes involved in the processing of user data traffic, and may separate handling of control signaling from user data traffic. As EPC networks increase in size and complexity, providing efficient and robust handling of control signaling can be quite challenging.

DETAILED DESCRIPTION OF PREFERRED EMBODIMENTS

Figure 1:
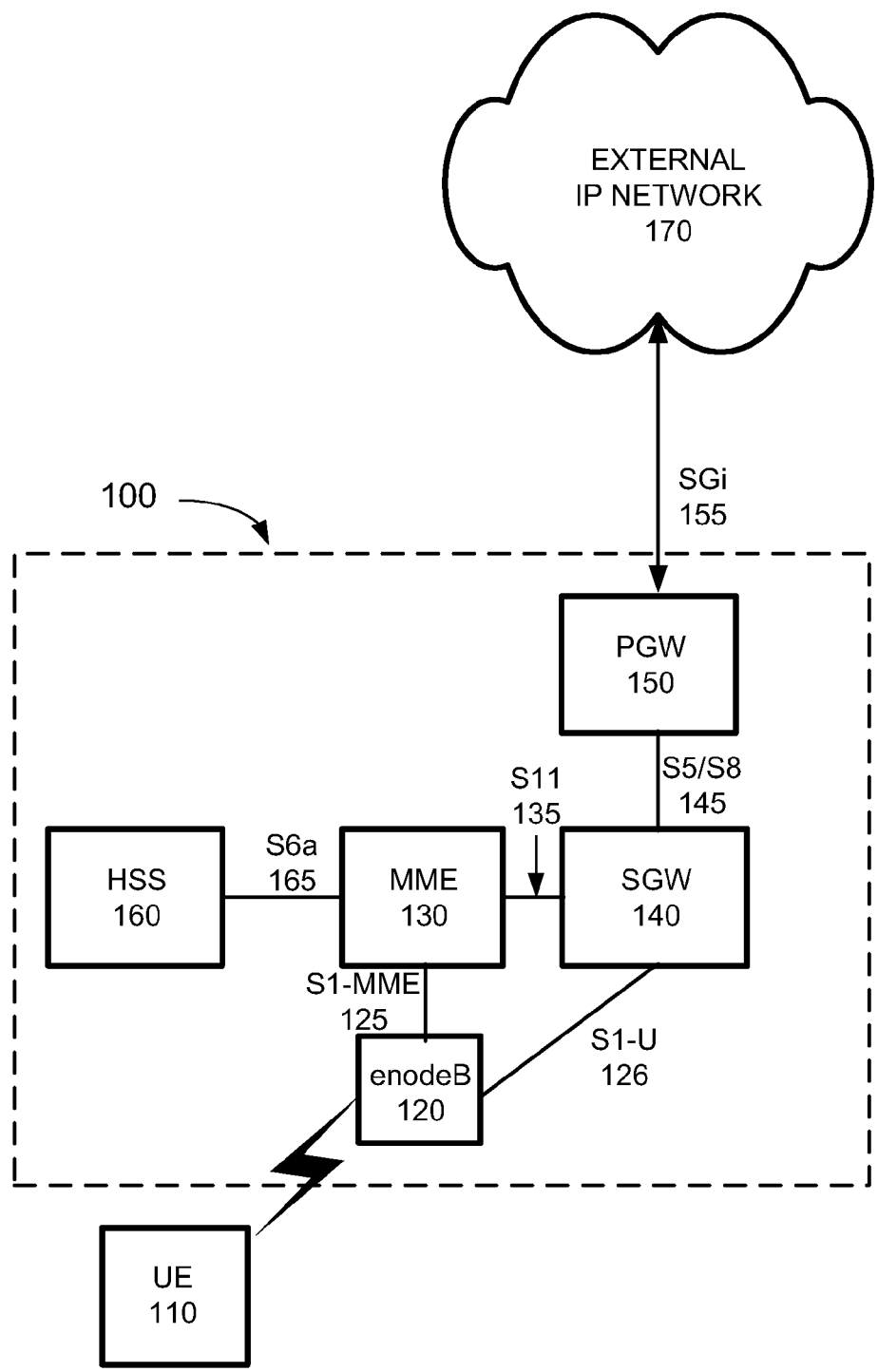
FIG. 1 is a diagram illustrating example components of a system according to an implementation described herein.

The following detailed description refers to the accompanying drawings. The same reference numbers in different drawings identify the same or similar elements. Also, the following detailed description does not limit the invention.

Implementations described herein may relate to mobility management entity (MME) device failover. An EPC network may include a MME device that performs control plane processing. For example, a MME device may select serving gateways for UEs, may implement tracking and paging procedures for UEs, may authenticate users of UEs, may activate and deactivate bearers (e.g., transport channels with particular Quality of Service (QoS) requirements), and may interface with non-LTE access networks.

A large EPC network may include more than one MME device. For example, an EPC network with two MME devices may include an active-standby configuration, meaning that a first MME device may be designated as an active MME device that handles control plane processing in the EPC network, and a second MME device may be designated as a standby MME device that takes over in case the first MME device becomes unavailable. A MME device may become unavailable if the MME device malfunctions, loses connectivity in one or more network connections to other devices in the network, or is taken offline for scheduled maintenance.

When a UE registers with an EPC network through an attach procedure, information about the UE is stored in a MME device. Thus, a MME device may include a database that stores information about UEs. In an active-standby configuration, a database associated with the active MME device, which stores information about UEs attached to the MME device, may be mirrored to a database associated with the standby MME device. Thus, if the active MME device fails, the standby MME device may access information associated with UEs by simply accessing the mirrored database. MME device failover may refer to a second MME device taking over after a first MME device has failed, with minimal loss of functionality in the EPC network.

However, an active-standby configuration may not fully utilize network resources, as the standby MME device may only become active if the active MME device fails. In contrast, an EPC network with two MME devices may include an active-active configuration, meaning that a first MME device may handle, and/or may communicate with, a first set of UEs, gateways, base stations and/or other nodes in the network; while the second MME device may handle, and/or may communicate with, a second set of UEs, gateways, base stations and/or other nodes in the network. In an active-active configuration, all MME devices in the EPC network may be active, and there may be no dedicated standby MME device. Therefore, if one of the active MME devices becomes unavailable (e.g., fails, loses connectivity, or is taken down for maintenance), one of the other active MME devices may have to take over the functionality of the unavailable MME device. This may mean that one of the other active MME devices may need to take over handling of, and/or communication with, the set of UEs, gateways, base stations and/or other nodes that were handled by the MME device that has become unavailable.

An implementation described herein may include exchanging periodic heartbeat messages between MME devices, and detecting, by a second MME device, that a first MME device is unavailable when a heartbeat message from the first MME device is not received. The second MME device may, in response to detecting that the first MME device is not available, take over the functionality of the first MME device. An implementation described herein may include exchanging periodic heartbeat messages between a MME device and a network node, such as a serving gateway, and detecting, by the network node, that the MME device is not available when a heartbeat message from the MME device is not received. The network node may, in response to detecting that the MME device is not available, initiate communication with another designated MME device.

In order for one active MME device to take over the functionality of another active MME device, information stored in the database of the MME devices may need to be shared. An implementation described herein may include backing up information from a database of a first MME device in a standby database of a second MME device, where the information may be used to communicate with a UE. For example, in one implementation, information that is backed up may include, for a particular UE, a Globally Unique Temporary Identifier (GUTI), a Tracking Area Code (TAC), an International Mobile Subscriber Identity (IMSI), security information, whether the particular UE is a special service UE, a serving Home Subscriber Server (HSS) of the UE, and/or QoS information.

When a second MME device takes over for a first MME device that has become unavailable, the UEs registered with the first MME (e.g., through an attach procedure) may need to re-register with the second MME. Registration of a UE may include one or more of assigning a GUTI to the UE, authenticating the UE, selecting a serving gateway for the UE, and/or establishing a standard bearer for the UE. A bearer may be thought of as a logical transport channel with particular QoS requirements.

When the second MME device takes over, the second MME device may communicate with all UEs served by the first MME device, to register the UEs with the second MME device. However, communicating with a potentially large set of UEs at once may tie up network resources and cause significant processing delays. To prevent tying up network resources or causing processing delays, the second MME device may communicate with a small number of UEs at a time. However, registering all UEs by registering a small number at a time may take a long time, and if a particular UE is at an end of a queue, the particular UE may wait a long time before the particular UE is able to use the EPC network.

An implementation described herein may include waiting until receiving a request to contact a particular UE, or waiting until the particular UE requests a service, before registering the particular UE with the second MME device. Thus, the second MME device may not communicate with a particular UE to be registered, which was previously registered with the first MME device, until, for example, a call for the particular UE is received, or until the particular UE places a call. This may prevent inactive UEs from tying up network resources by attempting to register with the new MME device.

Another implementation described herein may include providing information identifying a serving HSS device for a particular UE in a MME standby database. If a first MME device becomes unavailable, a second MME device may designate UEs registered with the first MME device to re-register with the second MME device. When a particular UE becomes active by requesting a service, or when a request to contact the particular UE is received, the second MME device may identify a particular HSS device associated with the particular UE based on information included in a standby database associated with the first MME device, and may obtain information, necessary to register the particular UE, from the identified HSS device.

FIG. 1 is a diagram illustrating example components of EPC network 100 according to an implementation described herein. As shown in FIG. 1, EPC network 100 may connect UE 110 to one or more external IP networks 170. EPC network 100 may include one or more devices that implement logical entities interconnected via standardized interfaces, and that provide wireless packet-switched services and wireless IP connectivity to UE 110 for both data and voice services. EPC network 100 may allow the delivery of broadband IP services and may interface with external IP network 170 (e.g., an IMS network). EPC network 100 may include an eNodeB 120, a MME device 130, a serving gateway (SGW) device 140, a packet data network gateway (PGW) device 150, and a HSS device 160. While FIG. 1 depicts a single UE 110, eNodeB 120, MME device 130, SGW 140, PGW 150, HSS device 160, and external IP network 170 for illustration purposes, in other implementations FIG. 1 may include multiple UEs 110, eNodeBs 120, MME devices 130, SGWs 140, PGWs 150, HSS devices 160, and/or external IP networks 170.

UE 110 may include any communication device that a user may use to connect to EPC network 100. For example, UE 110 may include a mobile communication device, such as a mobile phone, a personal digital assistant (PDA), a Global Positioning System (GPS) receiver or a media playing device with communication capabilities; a desktop device, such as a personal computer or a workstation; a laptop computer; a telephone terminal; or any other communication device or combinations thereof. In one implementation, UE device 110 may be associated with a particular user (e.g., UE device 110 may include a mobile phone). In another implementation, UE device 110 may not be associated with a particular user. For example, UE device 110 may include a device that communicates with EPC network 100 without user interaction, such as a telemetry device or a device dedicated for data collection.

eNodeB 120 may include one or more devices (e.g., base stations) and other components and functionality that allow UE 110 to wirelessly connect to EPC network 100. eNodeB 120 may interface with EPC network 100 via a S1 interface, which may be split into a control plane S1-MME interface 125 and a data place S1-U interface 126. S1-MME interface 125 may interface with MME device 130. S1-MME interface 125 may be implemented, for example, with a protocol stack that includes a Network Access Server (NAS) protocol and/or Stream Control Transmission Protocol (SCTP). S1-U interface 126 may interface with SGW 140 and may be implemented, for example, using a General Packet Radio Service Tunneling Protocol version 2 (GTPv2).

MME device 130 may implement control plane processing for EPC network 100. For example, MME device 130 may implement tracking and paging procedures for UE 110, may activate and deactivate bearers for UE 110, may authenticate a user of UE 110, and may interface to non-LTE radio access networks. MME device 130 may also select a particular SGW 140 for a particular UE 110. A particular MME device 130 may interface with other MME devices 130 in EPC network 100 and may send and receive information associated with UEs, which may allow one MME device to take over control plane processing of UEs serviced by another MME device, if the other MME device becomes unavailable.

SGW 140 may provide an access point to and from UE 110, may handle forwarding of data packets for UE 110, and may act as a local anchor point during handover procedures between eNodeBs 120. SGW 140 may interface with PGW 150 through an S5/S8 interface 145. S5/S8 interface 145 may be implemented, for example, using GTPv2.

PGW 150 may function as a gateway to external IP network 170 through an SGi interface 155. External IP network 170 may include, for example, an IP Multimedia Subsystem (IMS) network, which may provide voice and multimedia services to UE 110, based on Session Initiation Protocol (SIP). A particular UE 110, while connected to a single SGW 140, may be connected to multiple PGWs 150, one for each packet network with which UE 110 communicates.

MME device 130 may communicate with SGW 140 through an S11 interface 135. S11 interface 135 may be implemented, for example, using GTPv2. S11 interface 135 may be used to create and manage a new session for a particular UE 110. S11 interface 135 may be activated when MME device 130 needs to communicate with SGW 140, such as when the particular UE 110 attaches to EPC network 100, when bearers need to be added or modified for an existing session for the particular UE 110, when a connection to a new PGW 150 needs to created, or during a handover procedure (e.g., when the particular UE 110 needs to switch to a different SGW 140).

HSS device 160 may store information associated with UEs 110 and/or information associated with users of UEs 110. For example, HSS device 160 may store user profiles that include authentication and access authorization information. MME device 130 may communicate with HSS device 160 through an S6a interface 165. S6a interface 165 may be implemented, for example, using a Diameter protocol.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2A:
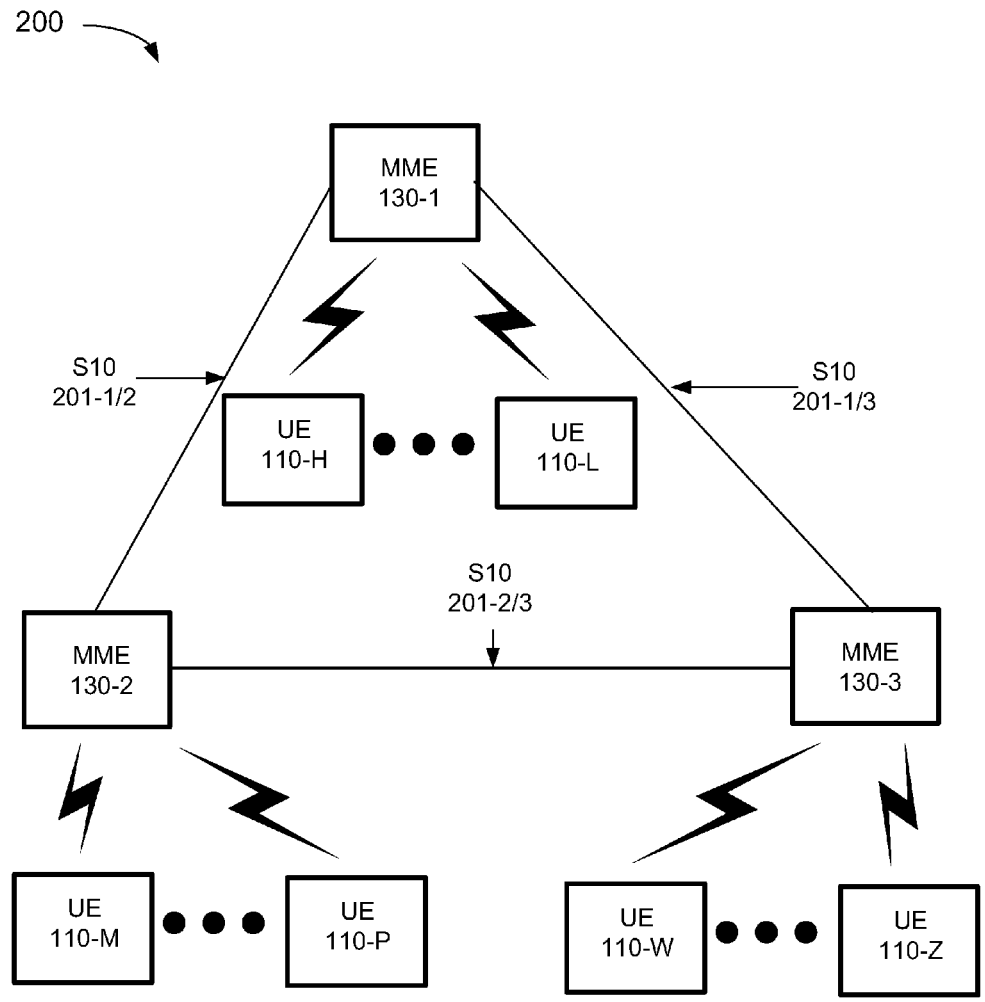
FIG. 2A is a diagram illustrating an arrangement of two mobility management entity (MME) devices according to an implementation described herein.

FIG. 2A is a diagram illustrating a MME arrangement 200 depicting a relationship between three MME devices in EPC network 100. As shown in FIG. 2A, arrangement 200 may include a first MME device 130-1, a second MME device 130-2, and a third MME device 130-3. Each MME device 130-1, 130-2, and 130-3 (collectively referred to as "MME devices 130") may communicate with multiple UEs 110, via one or more eNodeBs 120 (not shown in FIG. 2A). For example, MME device 130-1 may communicate with UEs 110-H to 110-L, MME device 130-2 may communicate with UEs 110-M to 110-P, and MME device 130-3 may communicate with UEs 110-W to 110-Z.

MME devices 130 may exchange messages via S10 interfaces 201. For example, MME device 130-1 and MME device 130-2 may communicate via a S10 interface 201-1/2, MME device 130-1 and MME device 130-3 may communicate via a S10 interface 201-1/3, and MME device 130-2 and MME device 130-3 may communicate via a S10 interface 201-2/3. S10 interfaces 201 may be implemented, for example, via GTPv2 for control plane (GTPv2-C).

Although FIG. 2A shows an example MME arrangement 200, in other implementations, MME arrangement 200 may include a different arrangement of MME devices 130 than shown in FIG. 2A. For example, while three MME devices 130 are shown in FIG. 2A, EPC network 100 may include any number of MME devices 130 (e.g., two or greater), where any given two of MME devices 130 may exchange messages via an S10 interface (or another type of interface).

Figure 2B:
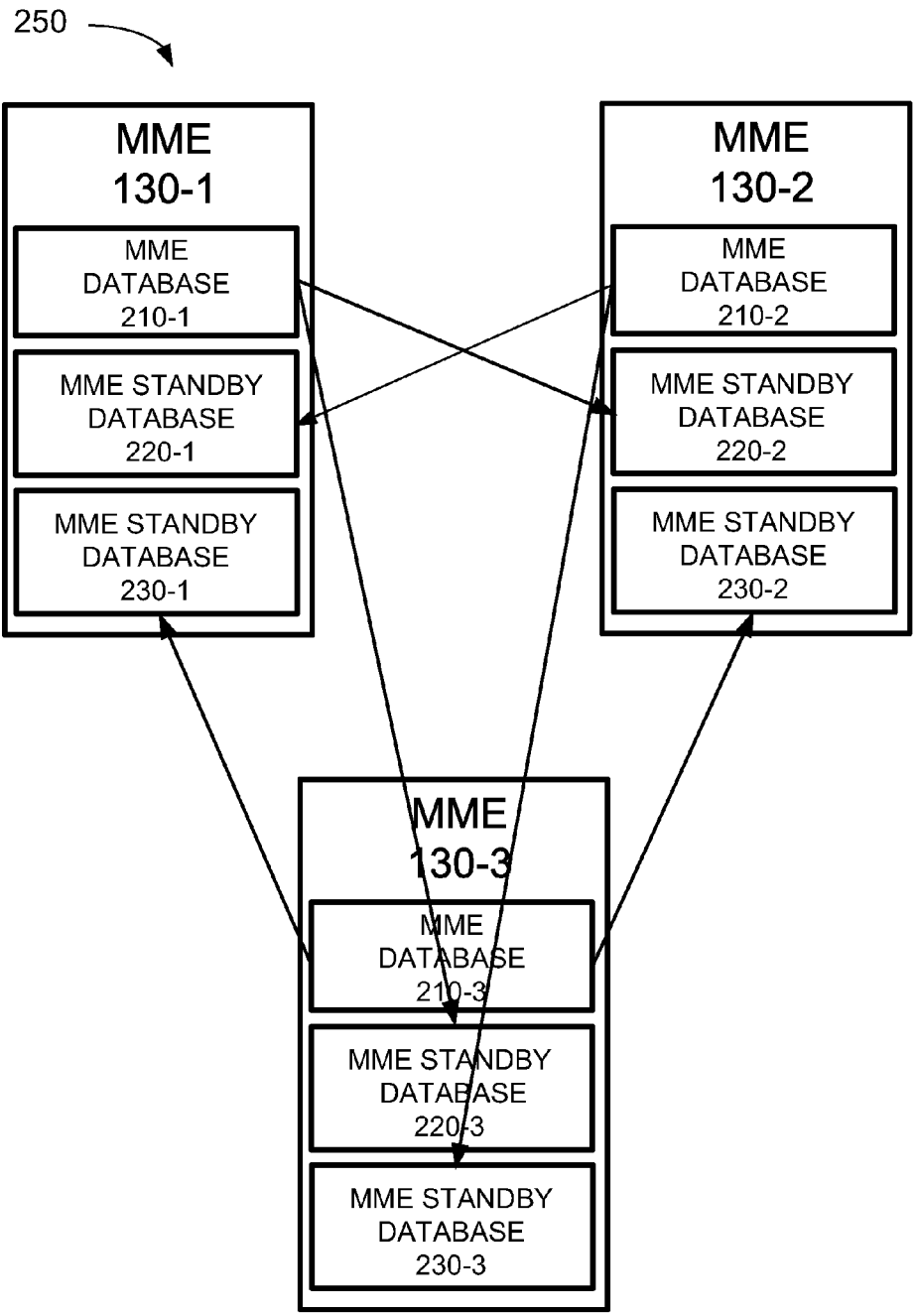
FIG. 2B is a diagram illustrating an arrangement of databases provided in MME devices according to an implementation described herein.

FIG. 2B is a diagram illustrating an arrangement 250 of databases provided in MME devices 130 (FIG. 2A) according to an implementation described herein. As shown in FIG. 2B, arrangement 250 may include first MME device 130-1, second MME device 130-2, and third MME device 130-3.

First MME device 130-1 may include a MME database 210-1, a MME standby database 220-1, and a MME standby database 230-1. MME database 210-1 may store information associated with UEs 110-H to 110-L. MME standby database 220-1 may store information associated with UEs 110-M to 110-P. Information stored in MME database 220-1 may be provided to MME device 130-1 by MME device 130-2 via S10 interface 201-1/2. MME standby database 230-1 may store information associated with UEs 110-W to 110-Z. Information stored in MME database 230-1 may be provided to MME device 130-1 by MME device 130-3 via S10 interface 201-1/3.

Similarly, second MME device 130-2 may include a MME database 210-2, a MME standby database 220-2, and a MME standby database 230-2. MME database 210-2 may store information associated with UEs 110-M to 110-P. MME standby database 220-2 may store information associated with UEs 110-H to 110-L. Information stored in MME database 220-2 may be provided to MME device 130-2 by MME device 130-1 via S10 interface 201-1/2. MME standby database 230-2 may store information associated with UEs 110-W to 110-Z. Information stored in MME database 230-2 may be provided to MME device 130-2 by MME device 130-3 via S10 interface 201-2/3.

Similarly, third MME device 130-3 may include a MME database 210-3, a MME standby database 220-3, and a MME standby database 230-3. MME database 210-3 may store information associated with UEs 110-W to 110-Z. MME standby database 220-3 may store information associated with UEs 110-H to 110-L. Information stored in MME database 220-3 may be provided to MME device 130-3 by MME device 130-1 via S10 interface 201-1/3. MME standby database 230-3 may store information associated with UEs 110-M to 110-P. Information stored in MME database 230-3 may be provided to MME device 130-3 by MME device 130-2 via S10 interface 201-2/3.

Although FIG. 2B shows an example arrangement of databases in database arrangement 250, in other implementations, database arrangement 250 may include a different arrangement of databases than shown in FIG. 2B. For example, while three MME devices 130 are shown in FIG. 2B, EPC network 100 may include any number of MME devices 130 (e.g., two or greater), where any given MME device 130 may provide information for a standby database to any other MME device 130 in EPC network 100.

Figure 3:
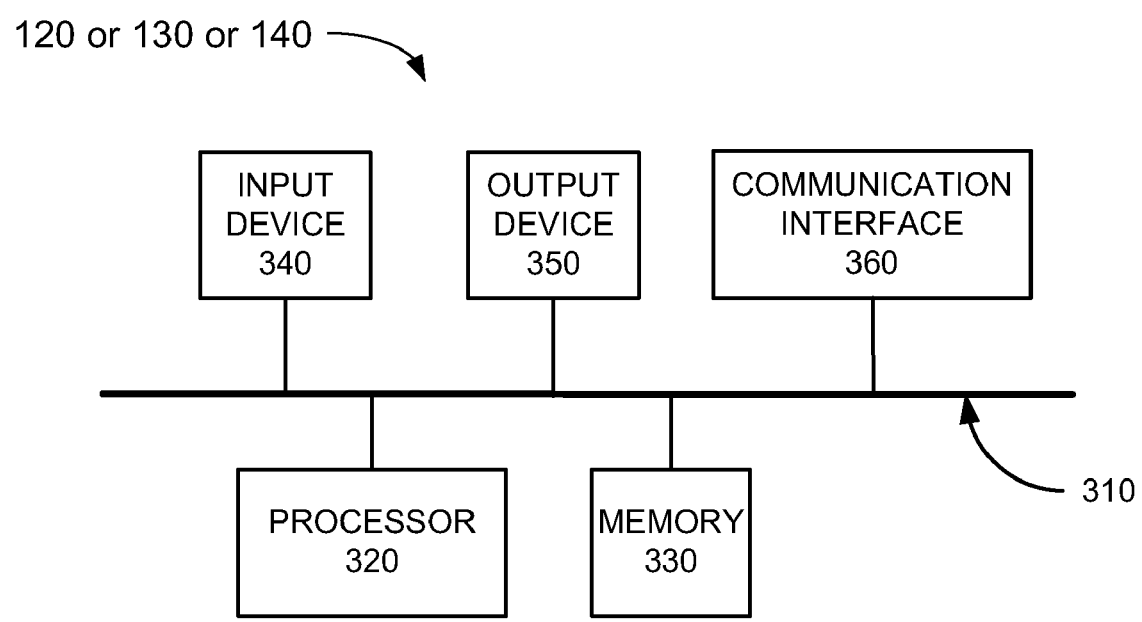
FIG. 3 is a diagram illustrating example components of a network node device according to an implementation described herein.

FIG. 3 is a diagram illustrating example components of a device that may correspond to eNodeB 120, MME device 130, or SGW 140, according to an implementation described herein. As shown, the device may include a bus 310, a processor 320, a memory 330, an input device 340, an output device 350, and a communication interface 360.

Bus 310 may include a path that permits communication among the components of the device. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to the device, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. Communication interface 360 may include any transceiver-like mechanism that enables the device to communicate with other devices and/or systems. For example, communication interface 360 may include mechanisms for communicating with another device or system via a network, such as EPC network 100 or external IP network 170. For example, communication interface 360 may include a modem, a network interface card, or a wireless interface card. In the case of eNodeB 120, communication interface 360 may include one or more radio frequency (RF) transceivers with one or more antennas.

As will be described in detail below, the device may perform certain operations. The device may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of a device, in other implementations, the device may contain fewer components, different components, additional components, or differently arranged components than depicted in FIG. 3. Additionally or alternatively, one or more components of the device may perform one or more tasks described as being performed by one or more other components of the device.

Figure 4A:
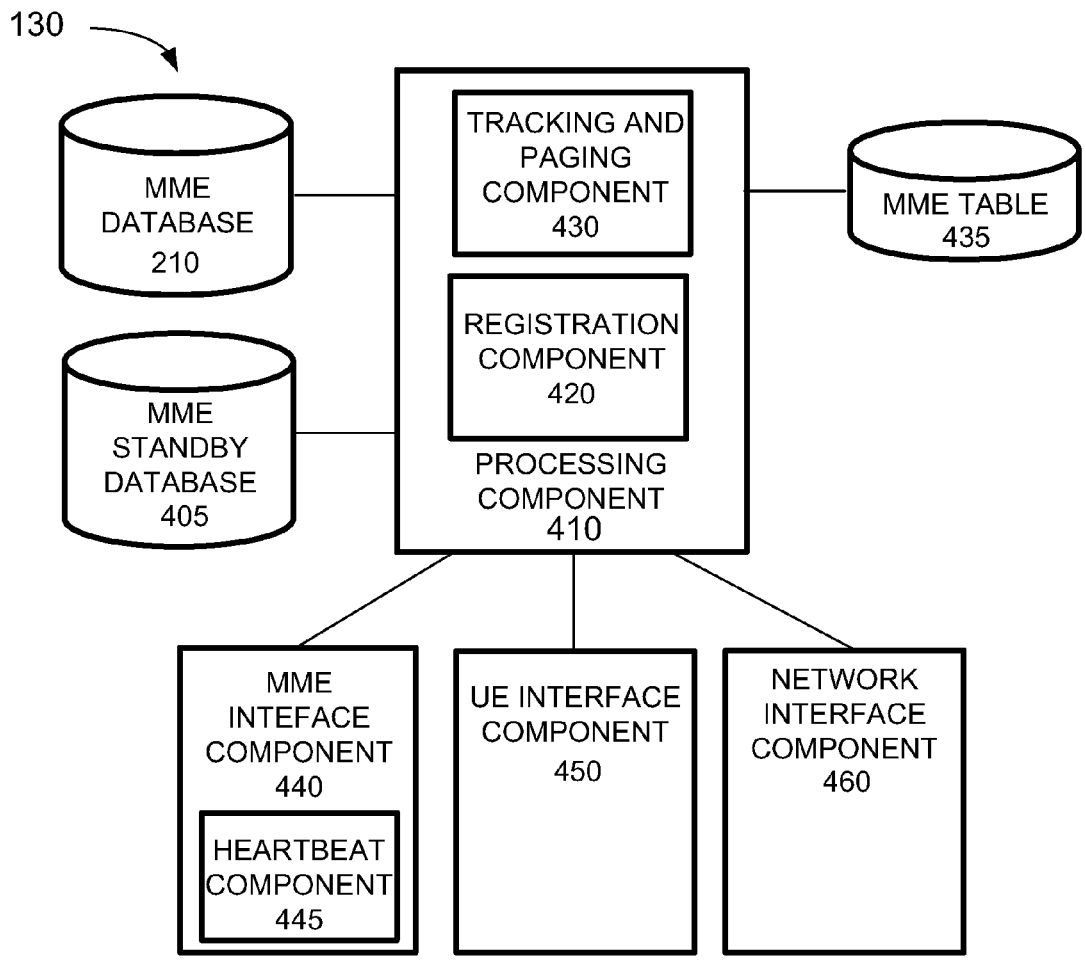
FIG. 4A is a diagram illustrating example functional components of a mobility management entity device according to an implementation described herein.

FIG. 4A is a diagram illustrating example functional components of MME device 130 according to an implementation described herein. As shown in FIG. 4A, MME device 130 may include MME database 210, MME standby databases 405, a processing component 410, a MME table 435, a MME interface component 440, a UE interface component 450, and a network interface component 460.

MME database 210 may store information associated with UEs registered with MME device 130. MME standby database 405 may store standby database information associated with UEs registered with other MME devices 130 in EPC network 100. For example, if MME device 130 of FIG. 4A corresponds to MME device 130-1 of FIG. 2B, MME standby database 405 may include MME standby database 220-1 and MME standby database 230-1.

Processing component 410 may perform processing functions and may include a registration component 420 and a tracking and paging component 430. Registration component 420 may register UE 110 with MME device 130. For example, registration component 420 may generate a GUTI for UE 110, or may change an existing GUTI to reflect a new MME device; may authenticate UE 110 by communicating with HSS device 160; and may set up a default bearer with UE 110. Registration component 420 may select particular UEs to register by consulting MME table 435 (described below).

Tracking and paging component 430 may track a location associated with UE 110. For example, tracking and paging component 430 may determine a particular eNodeB 120 that is communicating with UE 110, may determine a TAC associated with the particular eNodeB 120, and may store the TAC, in association with UE 110, in MME database 210. Tracking and paging component 430 may page UE 110 when MME device 130 needs to obtain information from UE 110. For example, tracking and paging component 430 may send a request to UE 110 to register with MME device 130, by requesting authentication information and/or by setting up a default bearer. For example, a default bearer may be set up by exchanging Radio Resource Control (RRC) protocol packets between UE 110 and MME device 130.

MME table 435 may store a series of rules that specify which MME device 130 will take over if a particular MME device 130 becomes unavailable, and how the UEs registered with the unavailable MME device 130 will be registered. If EPC network 100 only includes two MME devices 130, such as first MME device 130-1 and second MME device 130-2, the rules may simply specify that one MME device will re-register all UEs registered with the other MME device (e.g., first MME device 130-1 will re-register all UEs registered with second MME device 130-2 if second MME device 130-2 becomes unavailable). If EPC network 100 includes more than two MME devices, the rules may need to be more complex (e.g., see description of FIG. 8 below).

MME interface component 440 may communicate with other MME devices 130 in EPC network 100. MME interface component 440 may implement S10 interface 201. For example, if S10 interface 201 is implemented using GTPv2-C, MME interface component 440 may generate GTPv2-C packets and send the GTPv2-C packets to another MME device, and may receive GTPv2-C packets from other MME devices. MME interface component 440 may provide information about UEs to other MME devices in EPC network 130, may receive information about UEs registered with the other MME devices, and may provide the received information to MME standby database 405 for storing. For example, MME interface component 440 may send and receive information about new subscribers, or changes in service of existing subscribers (e.g., new UEs registered with MME device 130). As another example, MME interface component 440 may send and receive information about disconnected subscribers (e.g., UEs that no longer to be served by EPC network 100). In one implementation, information about UEs may be exchanged at particular periodic intervals. In another implementation, information about UEs may be exchanged in response to a trigger event, such as a UE connecting or disconnecting a subscription, or adding, dropping, or changing a service.

MME interface component 440 may include a heartbeat component 445. Heartbeat component 445 may send and receive heartbeat messages (e.g., keep-alive packets) from other MME devices. For example, heartbeat component 445 may send, at periodic intervals, a message to other MME devices in EPC network 100 indicating that MME device 130 is functioning properly. Heartbeat component 445 may receive heartbeat messages from other MME devices, indicating that the other MME devices are functioning properly. If heartbeat component 445 fails to receive a heartbeat message from another MME device in EPC network 100 within a particular time period, heartbeat component 445 may inform processing component 410 that a particular MME device has become unavailable. When the particular MME device becomes available again, it may resume sending heartbeat messages. Heartbeat component 445 may inform processing component 410 that the particular MME device has become available.

In one implementation, heartbeat component 445 may generate keep-alive packets that inform other MME devices in EPC network 100 that MME device 130 is functioning properly, and may cease sending the keep-alive packets if MME device 130 experiences a malfunction or loses connectivity. In another implementation, heartbeat component 445 may send, to other MME devices in EPC network 100, information specifying a particular type of malfunction or loss of connectivity. As an example, if MME device 130 loses connectivity with a particular eNodeB 120, MME device 130 may include, in a heartbeat packet to other MME devices and/or SGWs in EPC network 100, information specifying that MME device 130 has lost connectivity with the particular eNodeB 120. As another example, if MME device 130 is scheduled for maintenance, heartbeat component 445 may send information, to other MME devices and/or SGWs in EPC network 100, indicating how long MME device 130 will be unavailable. Based on this information, the other MME devices and/or SGWs may resume communication with MME device 130 after the specified time period elapses.

UE interface component 450 may communicate with UEs 110 via eNodeB 120. For example, UE interface component 450 may receive information from processing component 410 and generate appropriate protocol packets to S1-MME interface 125.

Network interface component 460 may communicate with other network nodes in EPC network 100. For example, network interface component 460 may communicate with SGW 140 and/or HSS device 160. Furthermore, network interface component 460 may communicate with non-LTE access networks. For example, if UE 110 leaves an area of coverage of EPC network 100, network interface component 440 may communicate with another access network, such as a General Packet Ration Service (GPRS) network, that may take over service for UE 110.

Although FIG. 4A shows example functional components of MME device 130, in other implementations, MME device 130 may contain fewer functional components, different functional components, differently arranged functional components, or additional functional components than depicted in FIG. 4A. Additionally or alternatively, one or more functional components of MME device 130 may perform one or more other tasks described as being performed by one or more other functional components of MME device 130.

Figure 4B:
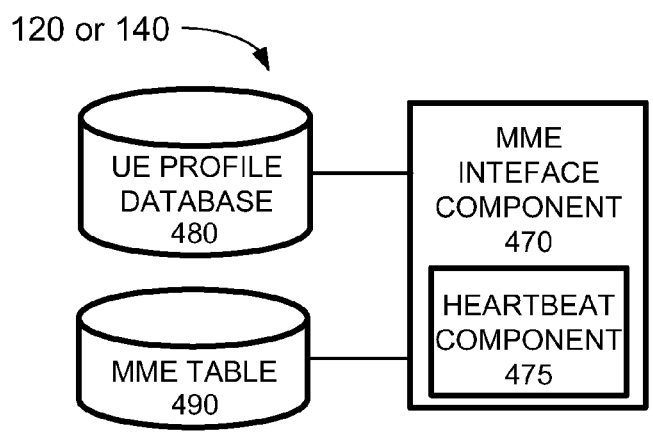
FIG. 4B is a diagram illustrating example functional components of a network node device according to an implementation described herein.

FIG. 4B is a diagram illustrating example functional components of eNodeB 120 or SGW 140 according to an implementation described herein. As shown in FIG. 4B, of eNodeB 120 or SGW 140 may include a MME interface component 470, an UE profile database 480, and a MME table 490.

MME interface component 470 may communicate with other MME device 130. For example, MME interface component 470 may implement S11 interface 135 (if representing SGW 140) or S1-MME interface 125 (if representing eNodeB 120). MME interface component 470 may send bearer requests on behalf of UE 110, and/or forward paging messages associated with UE 110. MME interface component 470 may be connected to all MME devices in EPC network 100 and may determine which particular MME device 130 to communicate with based on UE profile database 480.

MME interface component 470 may include heartbeat component 475. Heartbeat component 475 may send and receive heartbeat messages (e.g., keep-alive packets) from other MME devices 130. For example, heartbeat component 475 may receive heartbeat messages from MME device 130, indicating that MME device 130 is functioning properly. If heartbeat component 475 fails to receive a heartbeat message from a particular MME device 130 in EPC network 100 within a particular time period, heartbeat component 475 may determine that the particular MME device 130 has become unavailable, and may select a new MME device based on MME table 490. Heartbeat component 475 may store an indication in MME table 490 that the particular MME device 130 is unavailable. If heartbeat component 475 resumes receiving heartbeat messages from the particular MME device 130, heartbeat component 475 may store an indication in MME table 490 that the particular MME device 130 is again available.

Alternatively or additionally, MME interface component 470 may determine that a particular MME device is unavailable by receiving a message from another MME device in EPC network 100. For example, MME interface component 470 of SGW 140 may receive a message from MME device 130-2, via S11 interface, indicating that MME device 130-1 has become unavailable.

UE profile database 480 may store information associating a particular UE with a particular MME device. When MME interface component 470 needs to contact a particular MME device 130 on behalf of a particular UE 110, MME interface component 470 may access UE profile database 480 to select the particular MME device 130. For example, UE profile database 480 may associate IMSIs with GUTIs. When SGW 140 receives an incoming call for a particular UE, from another node in the network, the intended destination UE of the incoming call may be identified by the IMSI. SGW 140 may identify a GUTI associated with the IMSI, and may identify a particular MME device based on the GUTI. SGW 140 may then contact the particular MME device and provide the GUTI to the particular MME device. In response, the particular MME device may contact the recipient of the call to set up a dedicated bearer for the incoming call.

MME table 490 may store a sequence of MME devices that MME interface component 470 is to use when contacting a MME device 130. For example, if MME interface component 470 selects first MME device 130-1, based on UE profile database 470, MME interface component 470 may determine that MME device 130-1 is currently unavailable by consulting MME table 490. Alternatively or additionally, MME interface component 470 may attempt to communicate with MME device 130-1 and may not receive a reply from MME device 130-1. MME interface component 470 may consult MME table 490 to determine the next particular MME device to contact. For example, MME table 490 may indicate that if MME device 130-1, MME interface component 470 should consult MME device 130-2.

Although FIG. 4B shows example functional components of eNodeB 120 or SGW 140, in other implementations, eNodeB 120 or SGW 140 may contain fewer functional components, different functional components, differently arranged functional components, or additional functional components than depicted in FIG. 4B. Additionally or alternatively, one or more functional components of eNodeB 120 or SGW 140 may perform one or more other tasks described as being performed by one or more other functional components of eNodeB 120 or SGW 140. Furthermore, while FIG. 4B has been described as representing eNodeB 120 or SGW 140, FIG. 4B may represent another element of EPC network 100 that communicates with MME device 130, such as HSS device 160; or an element of another network that communicates with MME device 130, such as, for example, a Serving GPRS Support Node (SGSN) of a GPRS access network.

Figure 5:
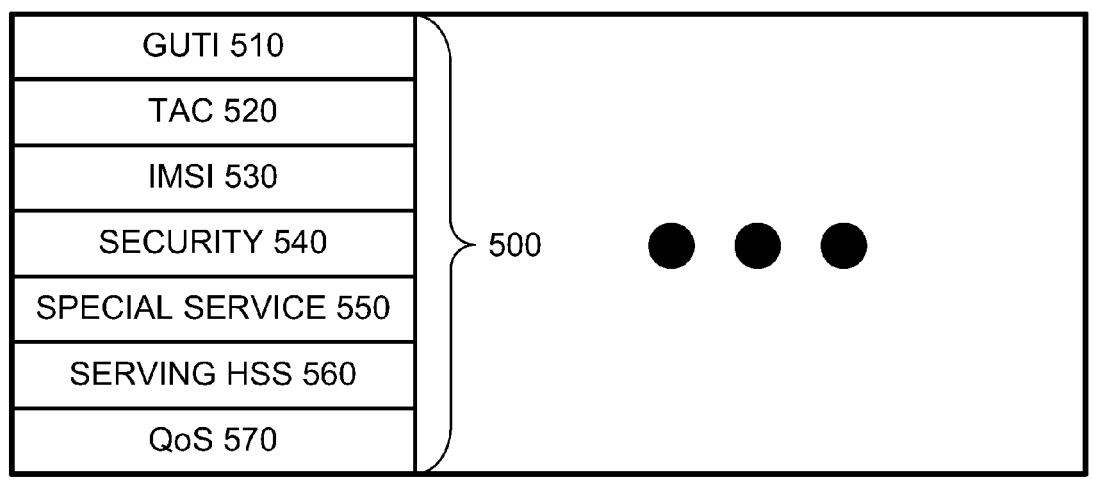
FIG. 5 is a diagram of example fields that may be stored within a standby database according to an implementation described herein.

FIG. 5 is a diagram of example fields that may be stored within MME standby database 405 according to an implementation described herein. In one implementation, MME standby database 405 may be implemented in a storage device included as part of memory 330 of MME device 130. In another implementation, MME standby database 405 may be stored in a memory associated with another device or a group of devices, separate from or including MME device 130. As shown in FIG. 5, MME standby database 405 may store UE records 500 associated with particular UEs. A UE record may include a GUTI field 510, a TAC field 520, an IMSI field 530, a security field 540, a special service field 550, a serving HSS field 560, and a QoS field 570.

GUTI field 510 may store a GUTI associated with the particular UE. A GUTI identifies a particular subscriber in the context of a particular MME device. A GUTI may include a Globally Unique MME Identifier (GUMMEI), which uniquely identifies a particular MME device, and a MME Temporary Subscriber Identity (M-TMSI), which identifies a particular UE within the MME device.

TAC field 520 may store information that identifies a tracking area in which the particular UE was last located. For example, a TAC may be associated with a group of eNodeBs 120. When MME device 130 needs to page the particular UE, it may identify a group of eNodeBs 120 based on the TAC, and send a paging message to all eNodeB base stations 120 associated with the TAC.

IMSI field 530 may store an IMSI associated with a user associated with the particular UE. An IMSI may be stored in a Subscriber Identity Module (SIM) card of the particular UE, and may be used for authentication and authorization of the user associated with the particular UE.

Security field 540 may store security information associated with the particular UE. For example, security field 540 may store any security associations, such as a particular encryption, between the particular UE and the MME with which the particular UE is registered (e.g., the MME device identified in GUTI field 510). Thus, when the particular UE needs to re-register with a new MME device, the new MME device may be able to recreate the security associations based on the information stored in security field 540.

Special service field 550 may store information about whether the particular UE is a special service UE. Special service UEs may include, for example, UEs associated with emergency medical services or associated with law enforcement services. Special service UEs may be given preference during re-registration. For example, when a first MME device fails or loses connectivity and a second MME device takes over, the second MME device may automatically page all special service UEs registered with the first MME device to re-register the special service UEs with the second MME device.

Serving HSS field 560 may store information identifying a particular HSS device 160 serving the particular UE. In one implementation, MME device 130 may page UE 110 to re-register UE 110. In another implementation, MME device 130 may contact the particular HSS device 160 associated with UE 110, and may re-register UE 110 based on information received from the particular HSS device 160.

QoS field 570 may store information about particular QoS requirements associated with the particular UE. For example, a user of the particular UE may pay for a higher download speed and thus may have a higher QoS requirement. MME device 130 may create a default bearer with particular QoS requirements based on information stored in QoS field 570.

Although FIG. 5 shows example fields of MME standby database 405, in other implementations, MME standby database 405 may contain fewer fields, different fields, additional fields, or differently arranged fields than depicted in FIG. 5. Additionally or alternatively, one or more fields of MME standby database 405 may include information described as being included in one or more other fields of MME standby database 405. For example, UE record 500 may include a register field that indicates whether a UE associated with UE record 500 has already be re-registered with a new MME device. As another example, UE record 500 may include an SGW field that identifies a particular SGW associated with the UE. MME device 130 may use information identifying the SGW to inform the SGW of the new MME device associated with the UE.

Figure 6:
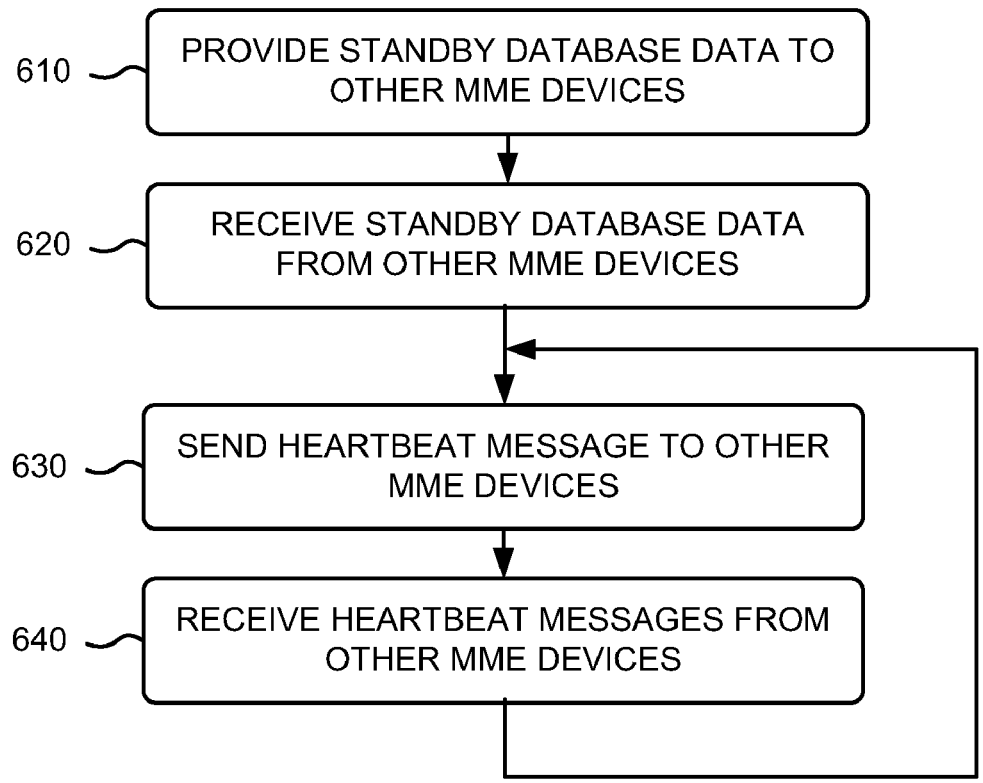
FIG. 6 is a flow diagram illustrating a process for backing up a mobility management entity database according to an example implementation.

FIG. 6 is a flow diagram illustrating a process for backing up a MME database according to an example implementation. In one implementation, the process of FIG. 6 may be performed by MME device 130. In other implementations, some or all of the process of FIG. 6 may be performed by another device or a group of devices separate from or including MME device 130.

The process of FIG. 6 may include providing standby database data to other MME devices (block 610). For example, first MME device 130-1 may provide information from MME database 210-1 to MME standby database 220-2 of second MME device 130-2. Standby database data from other MME devices may be received (block 620). For example, first MME device 130-1 may receive information from MME database 210-2 to store in MME standby database 220-1.

Standby database data may be sent and received at particular time intervals. For example, information about a particular percentage of UEs stored in MME database 210 may be provided to other MME devices at particular intervals. Alternatively or additionally, standby database information may be provided in response to a trigger event. For example, when a new UE 110 registers with first MME device 130-1, information about the new subscriber may be provided to MME standby database 220-2. As another example, if UE 110 disconnects service, the information may be provided to MME standby database 220-2.

A heartbeat message may be sent to other MME devices (block 630). For example, if EPC network 100 includes first MME device 130-1, second MME device 130-2, and third MME device 130-3, first MME device 130-1 may send a heartbeat message to second MME device 130-2 via S10 interface 201-1/2 and to third MME device 130-3 via S10 interface 201-1/3. The heartbeat message may be sent periodically at a particular interval.

Heartbeat messages may be received from other MME devices (block 640). For example, if EPC network 100 includes first MME device 130-1, second MME device 130-2, and third MME device 130-3, first MME device 130-1 may receive a heartbeat message from second MME device 130-2 via S10 interface 201-1/2 and from third MME device 130-3 via S10 interface 201-1/3. The heartbeat message may be received periodically at a particular interval.

Figure 7:
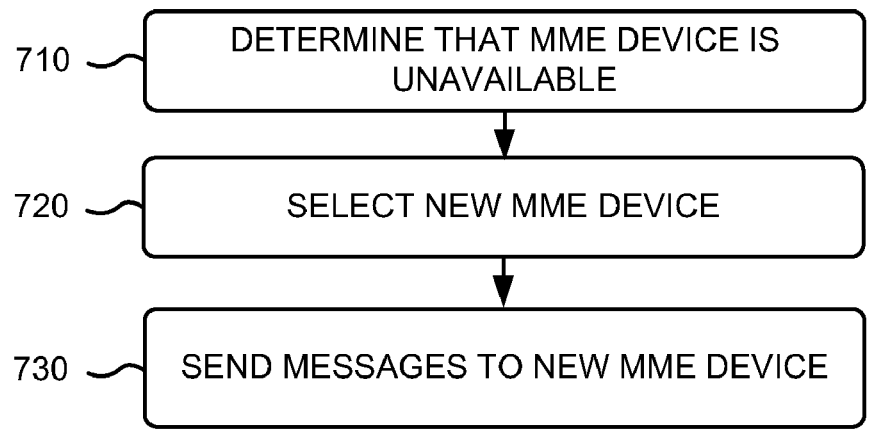
FIG. 7 is a flow diagram illustrating a process for selecting a new mobility management entity device according to an implementation described herein.

FIG. 7 is a flow diagram illustrating a process for selecting a new MME device according to an implementation described herein. In one implementation, the process of FIG. 7 may be performed by eNodeB 120. In another implementation, the process of FIG. 7 may be performed by SGW 140. In yet another implementation, the process of FIG. 7 may be performed by another network node in EPC network 100, or another network, that communicates with MME device 130. In still other implementations, some or all of the process of FIG. 7 may be performed by another device or a group of devices separate from or including MME device 130, eNodeB 120, SGW 140, or another network node in EPC network 100.

The process of FIG. 7 may include determining that a MME device is unavailable (block 710). For example, MME interface component 470 may determine that a particular MME device is unavailable and store and indication that the particular MME device is unavailable in MME table 490. In one implementation, heartbeat component 475 of MME interface component 470 may fail to receive a heartbeat message from the particular MME device. After a particular time period as elapsed in which heartbeat component 475 has not received a heartbeat message from the particular MME device, heartbeat component 475 may provide an indication to MME interface component 470 that the particular MME device has become unavailable.

In another implementation, MME interface component 470 may determine that a particular MME device is unavailable based on receiving a message from another MME device. For example, MME interface component 470 may receive a message from second MME device 130-2, indicating that first MME device 130-1 has become unavailable. In yet another implementation, MME interface component 470 may determine that a particular MME device is unavailable based on contacting the particular MME device and not receiving a reply from the particular MME device within a particular time period.

A new MME device may be selected (block 720). For example, MME interface component 470 may consult MME table 490, which may specify a sequence of particular MME device in which the particular MME devices are to be contacted. MME interface component 470 may select a next MME device from MME table 490.

Messages may be sent to the new MME device (block 730). For example, MME interface component 470 may send messages to the new selected MME device. Particular MME devices may be associated with particular UEs. Thus, MME interface component 470 may consult UE profile database 480, if MME interface component 470 needs to contact a particular MME device on behalf of a particular UE, to determine the particular MME device. MME interface component 470 may then determine whether the particular MME device is available by consulting MME table 490, and if the particular MME device is not available, MME interface component 470 may select a new MME device for the particular UE, based on MME table 490.

Figure 8:
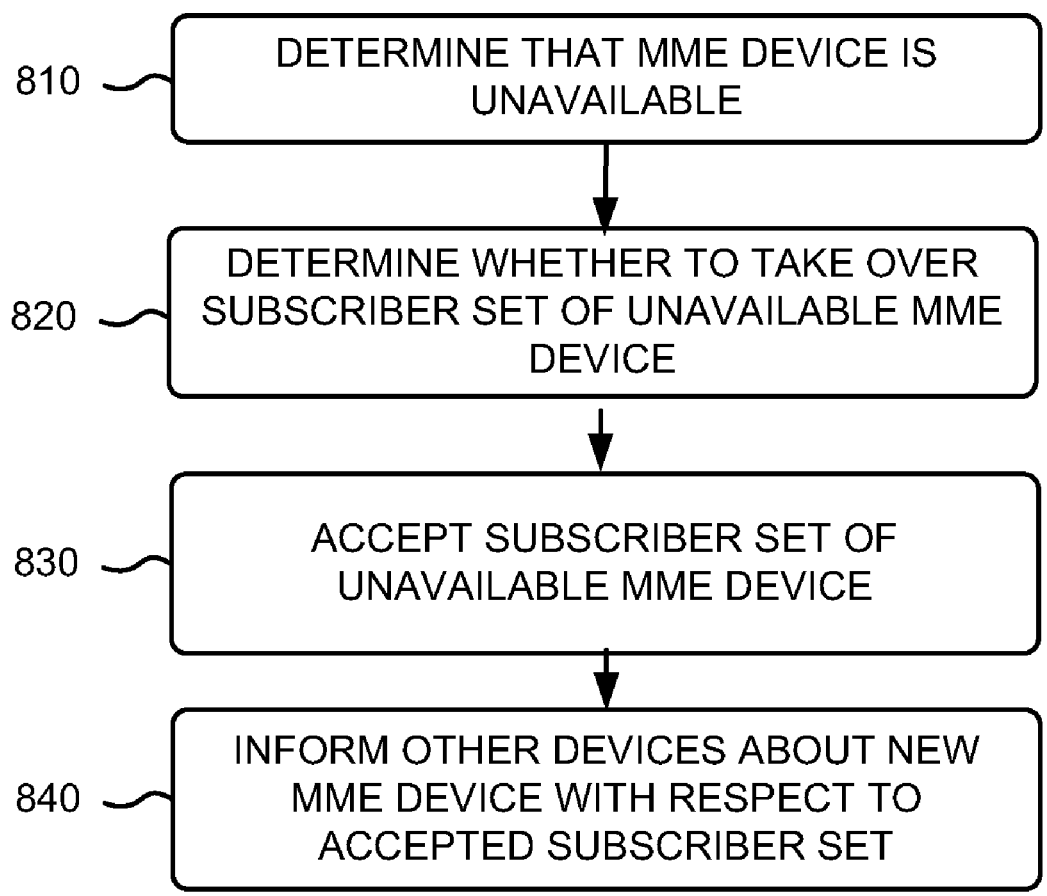
FIG. 8 is a flow diagram illustrating a process for taking over a subscriber set of an unavailable mobility management entity device according to an implementation described herein.

FIG. 8 is a flow diagram illustrating a process for taking over a subscriber set of an unavailable mobility management entity device according to an implementation described herein. In one implementation, the process of FIG. 8 may be performed by MME device 130. In other implementations, some or all of the process of FIG. 8 may be performed by another device or a group of devices separate from or including MME device 130.

The process of FIG. 8 may include determining that a MME device is unavailable (block 810). For example, MME interface component 440 may determine that a particular MME device is unavailable and store and indication that the particular MME device is unavailable. In one implementation, heartbeat component 445 of MME interface component 440 may fail to receive a heartbeat message from the particular MME device. After a particular time period as elapsed in which heartbeat component 445 has not received a heartbeat message from the particular MME device, heartbeat component 445 may provide an indication to MME interface component 460 that the particular MME device has become unavailable.

In one implementation, if a particular MME device experiences a malfunction that leaves the particular MME device operational yet not at full capacity, processing component 410 may instruct heartbeat component 445 to cease sending heartbeat messages. For example, the particular MME device may lose connectivity to HSS device 160, leaving the particular MME device unable to authenticate UEs 110. In response, heartbeat component 445 of the particular MME device may cease to send heartbeat messages, informing other MME devices in EPC network 100 that the MME device, which lost connectivity to HSS device 160, is to be considered unavailable.

In another implementation, processing component 410 may instruct heartbeat component 445 to provide specific information about a malfunction that may allow other MME devices 130 to take over a subset of UEs served by a MME device. For example, assume a first MME device 130 loses connectivity to a particular SGW 140, or to a particular eNodeB 120. The first MME device 130 may send information, via MME interface component 440, that a subset of the UEs served by the first MME device 130 is to be taken over by another MME device 130. For instance, first MME device 130 may indicate that all UEs 130 associated with a particular TAC, which is associated with an eNodeB 120 that cannot communicate with first MME device 130, should be re-registered with another MME device.

A determination of whether to take over a subscriber set of the unavailable MME device may be made (block 820). For example, registration component 420 may consult MME table 435 for a set of rules that specify which MME device will take over if a particular MME device becomes unavailable, and how the UEs registered with the unavailable MME device will be registered.

For example, in one implementation, the rules may specify that if a particular MME device becomes unavailable, the other MME devices in EPC network 100 may evenly distribute the set of UEs registered with the unavailable MME device. For example, if EPC network includes first MME device 130-1, second MME device 130-2, and third MME device 130-3, and first MME device 130-1 becomes unavailable, the rules may specify that second MME device 130-2 will re-register half of the UEs registered with first MME device 130-1 and third MME device 130-3 will re-register the other half of the UEs registered with first MME device 130-1.

In another implementation, if a particular MME device becomes unavailable, the other MME devices in EPC network 100 may evenly distribute UEs based on QoS requirements associated with particular UEs. For example, assume standby database 220 includes UEs associated with three different QoS Class Identifier (QCI) values. UEs registered with a failed MME device may be evenly distributed among the other MME devices for each QCI value.

In yet another implementation, if EPC network 100 includes an even number of MME devices (e.g., four MME devices), MME devices may be paired. For example, a first MME device may be paired with a second MME device, and a third MME device may be paired with a fourth MME device. If a particular MME device fails, the paired MME device may re-register the UEs registered with the failed MME device.

In yet another implementation, a particular MME device that takes over for a failed MME device may be selected based on geographical proximity. For example, if a particular MME device fails, the MME device that is the closest to the failed MME device may be designated to re-register the UEs registered with the failed MME device.

In yet another implementation, a particular MME device that takes over for a failed MME device may be selected based on load balancing. For example, MME devices in EPC network 100 may exchange messages, via S10 interface 201, about historical usage of processing resources. If a particular MME device fails, the MME device that has recently been experiencing the smallest processing load may be designated to re-register UEs registered with the failed MME device.

A subscriber set of the unavailable MME device may be accepted (block 830). For example, registration component 420 may designate that some, or all, UEs in MME standby database should be re-registered. For example, in one implementation, registration component 420 may change GUTIs associated with UEs that are to be re-registered, to reflect a new MME device. In another implementation, MME database 210 and MME standby database 405 may include a first field that identifies a MME associated with a particular UE, and a second field that identifies whether the particular UE is registered with the MME device or whether the particular MME device needs to re-register with the MME device.

Other devices may be informed about the new subscriber set with respect to the accepted subscriber set (block 840). For example, network interface component 460 of MME device 130 may send a message over S11 interface 135 to SGW 140, informing SGW 140 of the new MME device association for a set of UEs. For example, the message to SGW 140 may include IMSIs associated with the UEs, and SGW 140 may associate the IMSIs of the UEs with the new MME device (e.g., the message may associate IMSIs with GUTIs). As another example, MME device 130 may send a message to eNodeB 120, informing eNodeB 120 of the new MME device association for a set of UEs.

MME device 130 may proceed to automatically re-register particular UEs. For example, MME device 130 may automatically re-register special service UEs, identified based on special service field 550 of UE record 500 of MME standby database 405.

Figure 9:
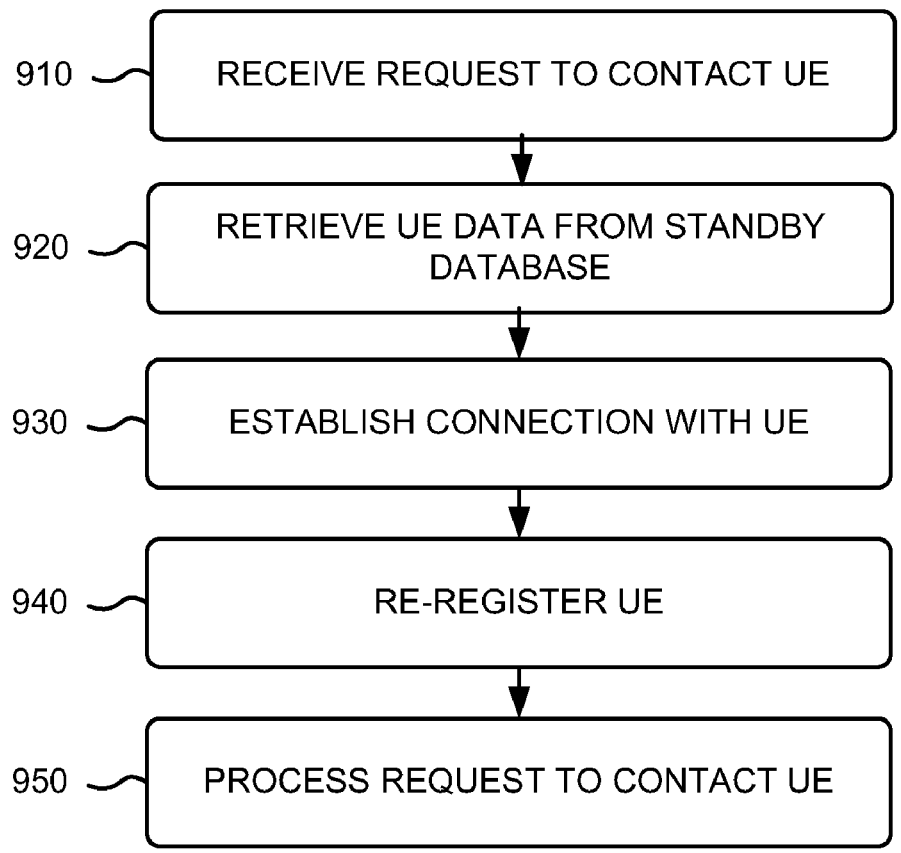
FIG. 9 is a flow diagram illustrating a first process for re-registering a UE according to an implementation described herein.

FIG. 9 is a flow diagram illustrating a first process for re-registering a UE according to an implementation described herein. The process of FIG. 9 illustrates a process of re-registering a UE in response to a request to contact the UE. In one implementation, the process of FIG. 9 may be performed by MME device 130. In other implementations, some or all of the process of FIG. 9 may be performed by another device or a group of devices separate from or including MME device 130.

The process of FIG. 9 may include receiving a request to contact a UE (block 910). For example, SGW 140, associated with UE 110, may receive an incoming call for UE 110. SGW 140 may identify UE 110 based on, for example, an IMSI associated with the incoming call. SGW 140 may identify MME device 130 by, for example, accessing UE profile database 480 and identifying a particular MME device associated with IMSI. MME device 130 may receive a request from SGW 140 to set up a bearer between SGW 140 and UE 110. MME device 130 may not identify a record associated with UE 210, and may access MME standby database 405.

UE data may be retrieved from a standby database (block 920). For example, MME device 130 may identify UE 110 based on the IMSI received from SGW 140. MME device 130 may retrieve a GUTI and TAC associated with the UE from standby database 405.

A connection may be established with the UE (block 930). For example, MME device 130 may identify one or more eNodeBs 120 associated with the received TAC, and may page UE 110, using the retrieved GUTI, by sending a paging signal to the identified one or more eNodeBs 120. The signal may include a request for UE 110 to re-register with MME device 130. In another implementation, a connection with the UE need not be established. Rather, MME device 130 may identify a serving HSS stored in serving HSS field 560 of UE record 500 associated with the UE. MME device 130 may then contact the serving HSS device 160 to obtain information necessary to re-register UE 110.

The UE may be re-registered (block 940). For example, registration component 420 of MME device 130 may assign a GUTI, associated with MME device 130, to UE 110, may authenticate UE 110, and/or may set up a default bearer for UE 110. The request to contact the UE may be processed (block 950). For example, MME device 130 may set up a dedicated bearer associated with the incoming call, by contacting SGW 140, associated with UE 110, over S11 interface 135.

Figure 10:
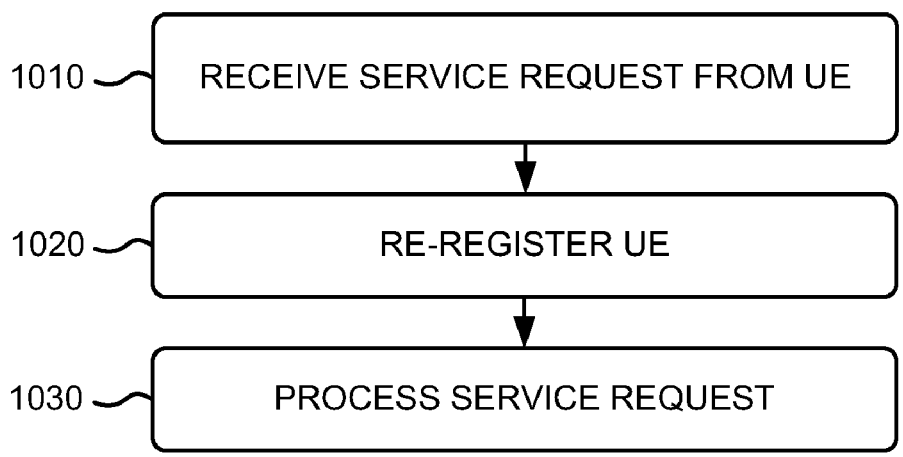
FIG. 10 is a flow diagram illustrating a second process for re-registering a UE according to an implementation described herein.

FIG. 10 is a flow diagram illustrating a second process for re-registering a user equipment device according to an implementation described herein. The process of FIG. 10 illustrates a process of re-registering a UE in response to the UE requesting a service. In one implementation, the process of FIG. 10 may be performed by MME device 130. In other implementations, some or all of the process of FIG. 10 may be performed by another device or a group of devices separate from or including MME device 130.

The process of FIG. 10 may include receiving a service request from a UE (block 1010). For example, UE 110 may place a call, activate a browser application, or access an email account. eNodeB 120 may forward the request to a particular MME device 130, based on UE profile database 470. If the MME device 130 identified in DE profile database 470 cannot be reached, eNodeB 120 may contact a next MME device 130 based on MME table 480. Once MME device 130 receives the request, MME device 130 may determine that UE 110 is not registered. For example, MME device 130 may determine that UE 110 does not have a GUTI associated with MME device 130. As another example, MME device 130 may determine that a re-register flag has been set in a record associated with UE 110 (e.g., in standby database record 500 associated with UE 110).

The UE may be re-registered (block 1020). For example, registration component 420 of MME device 130 may assign a GUTI, associated with MME device 130, to UE 110, may authenticate UE 110, and/or may set up a default bearer for UE 110.

The service request may be processed (block 1030). For example, MME device 130 may set up a dedicated bearer associated with the received service request, by contacting SGW 140, associated with UE 110, over S11 interface 135. MME device 130 may give preference to particular UEs based on QoS requirements. For example, if multiple UEs need to be re-registered at substantially the same time, MME device 130 may compare QoS requirements associated with the multiple UEs by accessing QoS field 570 of UE records 500 associated with the multiple UEs, and may re-register UEs associated with higher QoS requirements first.

Figure 11:
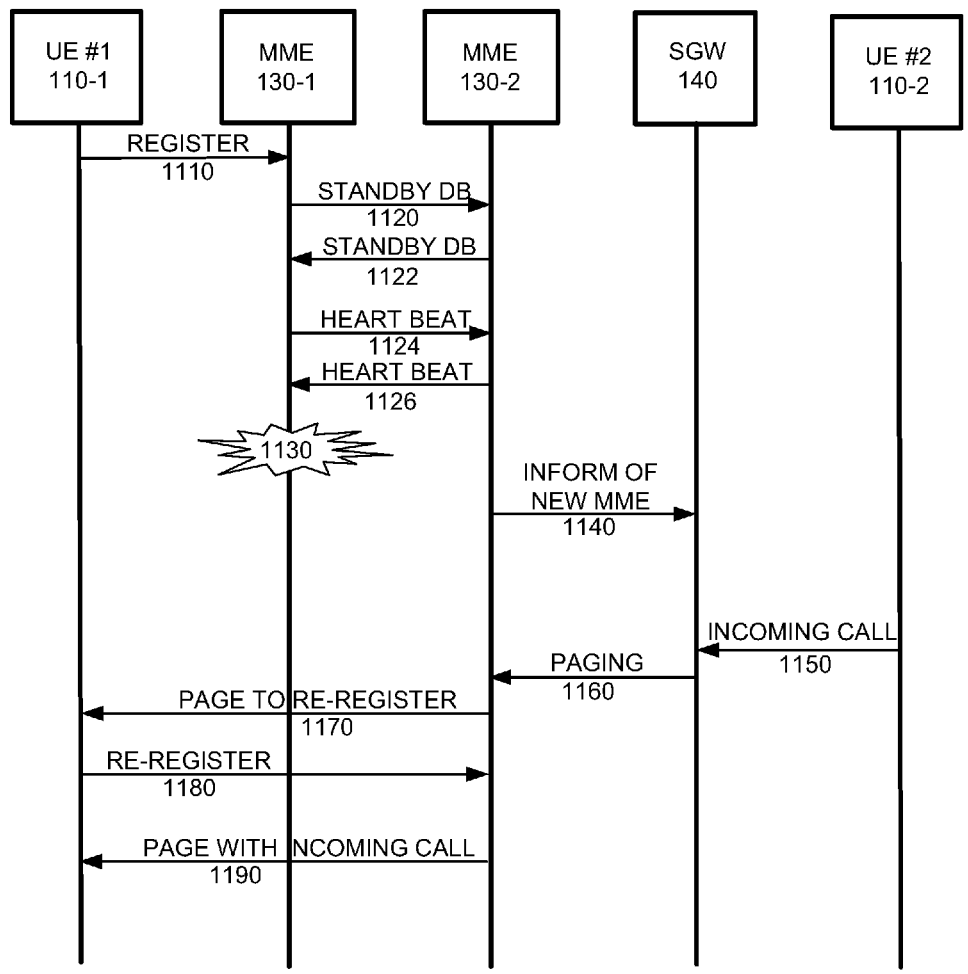
FIG. 11 is a first example of a signal flow according to an implementation described herein.

FIG. 11 is a first example of a signal flow according to an implementation described herein. In the example of FIG. 11, a second MME device 130-2 may inform SGW 140 that a first MME device 130-1, which was previously associated with SGW 140, is unavailable, and that SGW 140 is to contact second MME device 130-2 in the future.

The signal flow of the example of FIG. 11 may begin with UE 110-1 sending registration information to first MME device 130-1 (e.g., via register signal 1110). First MME device 130-1 and second MME device 130-2 may exchange standby database information associated with UEs registered with each MME device (e.g., via standby database signal 1120 and standby database signal 1122). Additionally, first MME device 130-1 and second MME device 130-2 may exchange heartbeat signals at particular intervals (e.g., heartbeat signal 1124 and heartbeat signal 1126). At a later time, first MME device 130-1 may suffer a malfunction 1130. For example, first MME device 130-1 may experience a software crash. In response, first MME device 130-1 will cease to send heartbeat signals 1124/1126 to second MME device 130-2.

Second MME device 130-2 may inform other devices, associated with first MME device 130-1, that the devices should now communicate with second MME device 130-2. For example, assume SGW 140 serves UEs registered with first MME device 130-1. Second MME device 130-2 may send a message 1140 informing SGW 140 that second MME device 130-2 is the MME device with which SGW 140 should now communicate.

An incoming call 1150 may be received by SGW 140 from UE 110-2. The intended recipient of incoming call 1150 may be UE 110-1, which was last registered with MME device 130-1. SGW 140 may page second MME device 130-2, informing second MME device 130-2 that a call is being placed to UE 110-1 (e.g., via paging signal 1160).

Second MME device 130-2 may determine that first UE 110-1 has not been registered with second MME device 130-2, and may page first UE 110-1 to register (e.g., via page to re-register signal 1170). In response, first UE 110-1 may re-register with second MME device 130-2 (e.g., via re-register signal 1180). After the first UE 110-1 has re-registered with second MME device 130-2, second MME device 130-2 may page first UE 110-1 with the incoming call (e.g., via page with incoming call signal 1190).

Figure 12:
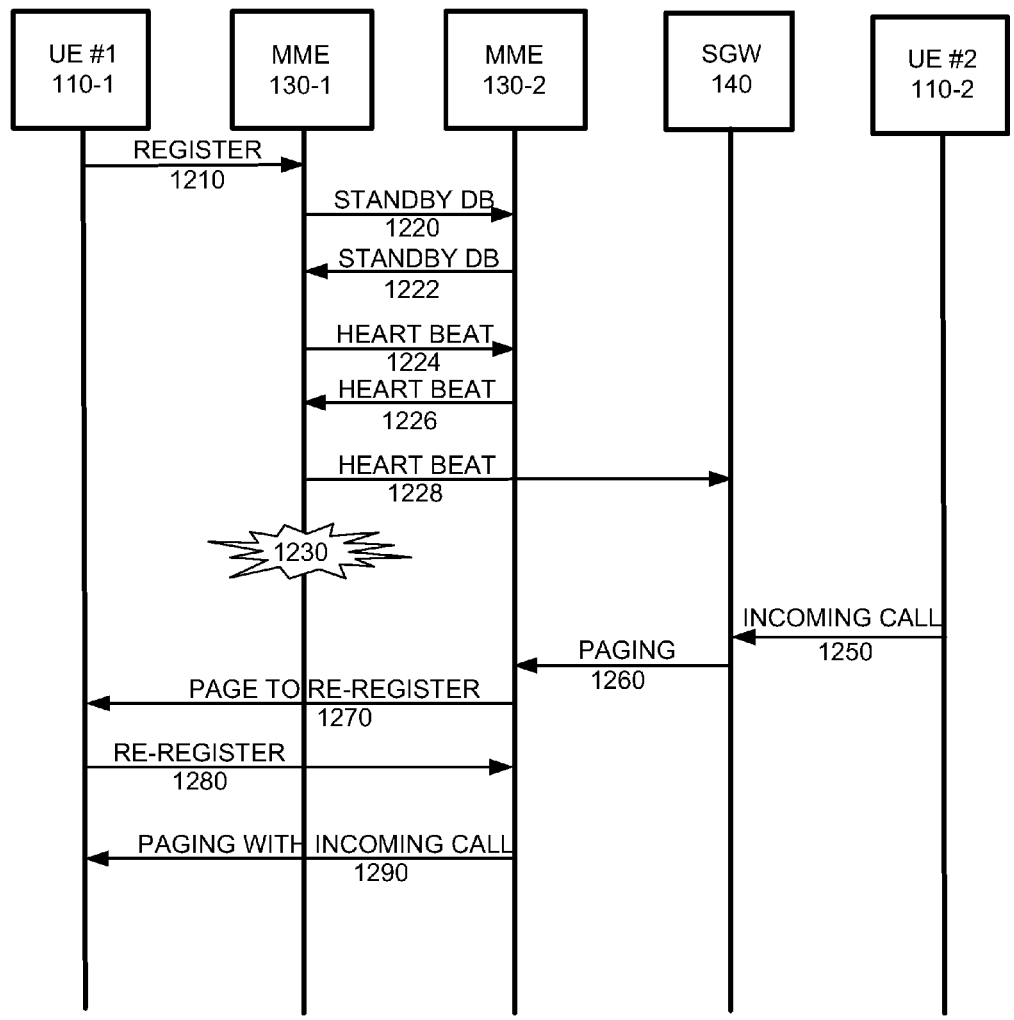
FIG. 12 is a second example of a signal flow according to an implementation described herein.

FIG. 12 is a second example of a signal flow according to an implementation described herein. In the example of FIG. 12, first MME 130-1 and SGW 140 may exchange heartbeat messages, and SGW 140 may detect that first MME 130-1 has become unavailable if SGW 140 fails to receive a heartbeat message The signal flow of the example of FIG. 12 may begin with UE 110-1 sending registration information to a first MME device 130-1 (e.g., via register signal 1210). First MME device 130-1 and second MME device 130-2 may exchange standby database information associated with UEs registered with each MME device (e.g., via standby database signal 1220 and standby database signal 1222). Additionally, first MME device 130-1 and second MME device 130-2 may exchange heartbeat signals 1224 and 1226 at particular intervals. Furthermore, first MME device 130-1 may send a heartbeat signal 1228 to SGW 140 at periodic intervals.

At a later time, first MME device 130-1 may suffer a malfunction 1230. For example, first MME device 130-1 may experience a software crash. In response, the first MME device 130-1 may cease sending heartbeat signal 1224 to second MME device 130-2, and may cease sending heartbeat signal 1228 to SGW 140. When second MME device 130-2 does not detect heartbeat signal 1224, second MME device 130-2 may designate that UEs 110 previously registered with first MME device 130-1 should be re-registered with second MME device 130-2. Furthermore, when SGW 140 does not detect heartbeat signal 1228, SGW 140 may determine that first MME device 130-1 is unavailable, may consult MME table 480 and may determine that SGW 140 should now communicate with second MME device 130-2, based on information included in MME table 480.

An incoming call 1250 may be received by SGW 140 from second UE 110-2. The intended recipient of incoming call 1250 may be UE 110-1, which was last registered with MME device 130-1. SGW 140 may page second MME device 130-2, informing second MME device 130-2 that a call is being placed to first UE 110-1 (e.g., via paging signal 1260).

Second MME device 130-2 may determine that first UE 110-1 has not been registered with second MME device 130-2, and may page first UE 110-1 to register (e.g., via page to re-register signal 1270). In response, first UE 110-1 may re-register with second MME device 130-2 (e.g., via re-register signal 1280). After the first UE 110-1 has re-registered with second MME device 130-2, second MME device 130-2 may page first UE 110-1 with the incoming call (e.g., page with incoming call signal 1290).

Figure 13:
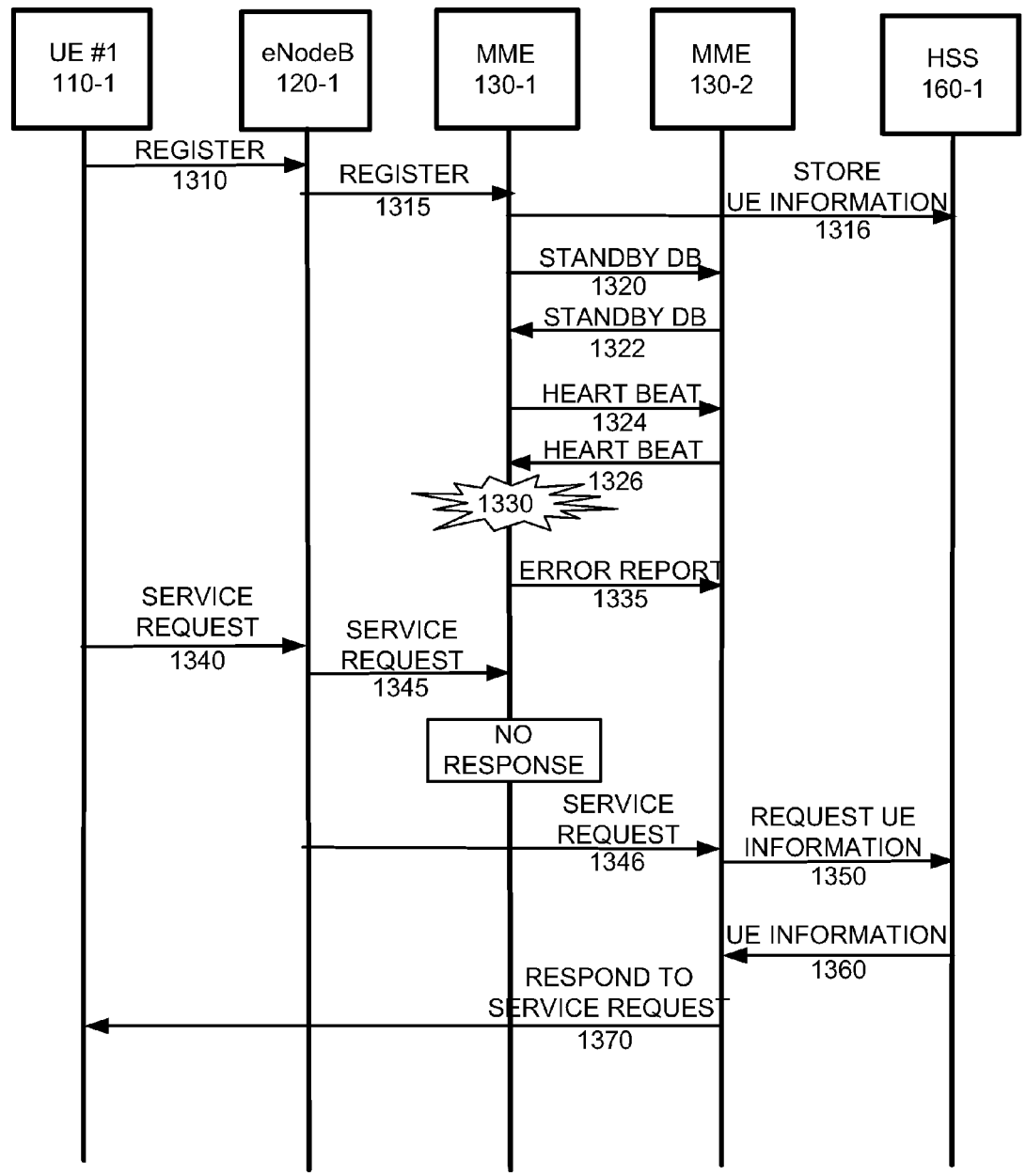
FIG. 13 is a third example of a signal flow according to an implementation described herein.

FIG. 13 is a third example of a signal flow according to an implementation described herein. In the example of FIG. 13, eNodeB 120 may contact a first MME device, and in response to not receiving a response, may contact a second MME device, based on not receiving a response from the first MME device, and based on consulting MME table 490. Furthermore, in the example of FIG. 13, the second MME device re-registers UE 110 based on information obtained from HSS 160, rather than by paging UE 110.

The signal flow of the example of FIG. 13 may begin with first UE 110-1 sending registration information to first MME device 130-1. First eNodeB 120-1 may receive the signal (e.g., via register signal 1310) and may forward the signal to first MME device 130-1 (e.g., via register signal 1315). First MME device 130-1 may provide information associated with UE 110-1 to first HSS device 160-1 (e.g., via store UE information signal 1316). The information provided to first HSS device 160-1 may include, for example, authentication information associated with first UE 110-1.

First MME device 130-1 and second MME device 130-2 may exchange standby database information associated with UEs registered with each MME device (e.g., via standby database signal 1320 and standby database signal 1322). Additionally, first MME device 130-1 and second MME device 130-2 may exchange heartbeat signals at particular intervals (e.g., heartbeat signal 1324 and heartbeat signal 1326).

At a later time, first MME device 130-1 may suffer a malfunction 1330. For example, first MME device 130-1 may lose connectivity with first eNodeB 120-1. Thus, MME device 130-1 may function with respect to other eNodeB base stations 120. First MME device 130-1 may send an error report, within a heartbeat message, indicating that UEs associated with a TAC, associated with first eNodeB 120-1, should re-register with second MME device 130-2 (e.g., via error report signal 1335). Second MME device 130-2 may designate that UEs, associated with the received TAC in standby database 405, should re-register with second MME device 130-2.

At a later time, a user of first UE 110-1 may activate an application that requires communication with EPC network 100. For example, the user may activate a Web browser application. In response, first UE 110-1 may send a request to set up a bearer to MME 130-1. eNodeB 120 may receive the request (e.g., via service request signal 1340), and may forward the request to first MME device 130-1 (e.g., via service request signal 1345). First eNodeB 120-1 may not receive an acknowledgement response from MME device 130-1. After a particular amount of time, first eNodeB 120-1 may consult MME table 480 and may forward the request to second MME device 130-2 (e.g., via service request 1346). Second MME device 130-2 may determine that the request is associated with a UE that needs to be re-registered with second MME device 130-2.

MME device 130-2 may consult MME standby database 405 to identify a serving HSS device associated with first UE 110-1. MME device 130-2 may then contact first HSS device 160-1 to request information required to register first UE 110-1 (e.g., via request UE information signal 1350). First HSS device 160-1 may provide the requested UE information (e.g., via UE information signal 1360), allowing second MME device 1309-2 to re-register first UE 110-1 with second MME device 130-2. Second MME device 130-2 may then respond to the service request by, for example, setting up a dedicated bearer for first UE 110-1 (e.g., via respond to service request signal 1370).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-10, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a first mobility management entity (MME) device in a network, the method comprising:
    receiving, from a second MME device and by a storage device associated with the first MME device, standby database information associated with user equipment (UE) registered with the second MME device;
    detecting, by a processor associated with the first MME device, that the second MME device has failed or lost connectivity;
    designating, by the processor, that the UEs registered with the second MME device will be registered with the first MME device, in response to detecting that the second MME device has failed or lost connectivity;
    detecting, by the processor, a request to activate a particular UE registered with the second MME device; and
    paging, by a communication interface associated with the first MME device, the particular UE to register with the first MME device, using the standby database information and in response to detecting the request to activate the particular UE.

2. The method of claim 1, where the standby database information includes, for a particular UE, one or more of:
    a Globally Unique Temporary Identifier (GUTI) that associates the particular UE with a particular MME device;
    a Tracking Area Code (TAC) that associates the particular UE with one or more base stations; or
    an International Mobile Subscriber Identity (IMSI) that identifies the particular UE within the network.

3. The method of claim 2, where the standby database information further includes one or more of:
    security information associated with the particular UE;
    an indication of whether the particular UE is a special service UE;
    a serving Home Subscriber Server (HSS) associated with the particular UE; or
    quality of service (QoS) requirements associated with the particular UE.

4. The method of claim 1, further comprising:
    receiving, at particular intervals, a heartbeat message from the second MME device, where receiving the heartbeat message indicates that the second MME device is functioning properly; and
    where detecting that the second MME device has failed or lost connectivity includes detecting that a heartbeat message was not received from the second MME device within a particular time period.

5. The method of claim 4, where the receiving a heartbeat message occurs over an S10 interface defined by a Long Term Evolution (LTE) standard.

6. The method of claim 1, where designating that the UEs registered with the second MME device will be registered with the first MME device is performed in response to consulting a MME table that stores rules that specify which MME device will take over if a particular MME device becomes unavailable.

7. The method of claim 1, further comprising:
    informing another device that the second MME device has failed or lost connectivity.

8. The method of claim 7, where informing another device that the second MME device has failed or lost connectivity comprises:
    informing a serving gateway (SGW) associated with the particular UE, that the particular UE, registered with the second MME device, is to be associated with the first MME device.

9. The method of claim 7, where informing another device that the second MME device has failed or lost connectivity comprises:
    informing a base station associated with the particular UE, that the particular UE, registered with the second MME device, is to be associated with the first MME device.

10. The method of claim 1, where detecting a request to activate the particular UE includes receiving a message from a serving gateway (SGW), associated with the particular UE, informing the first MME device of an incoming call for the particular UE.

11. The method of claim 1, further comprising:
    sending, at particular intervals, a heartbeat message to other MME devices in the network.

12. The method of claim 1, further comprising:
    sending, at particular intervals, a heartbeat message to at least one serving gateway (SGW) in the network.

13. The method of claim 12, where the heartbeat message is sent via an S11 interface defined by a Long Term Evolution (LTE) standard.

14. The method of claim 1, further comprising:
identifying UEs designated as special service UEs, in response to designating that the UEs registered with the second MME device will be registered with the first MME device; and
automatically re-registering the identified UEs designated as special service UEs with the first MME device, in response to designating that the UEs registered with the second MME device will be registered with the first MME device.

15. A mobility management entity (MME) device, associated with a network, comprising:
a memory to store instructions; and
a processor to execute the instructions to:
receive, from another MME device in the network, standby database information associated with user equipment (UE) registered with the MME device;
detect that the other MME device has failed or lost connectivity;
designate that at least some of the UEs registered with the other MME device will be registered with the MME device, in response to detecting that the other MME device has failed or lost connectivity;
detect an incoming call to a particular UE of the at least some of the UEs;
contact a particular Home Subscriber Server (HSS) associated with the particular UE to request information associated with the particular UE, in response to detecting the incoming call, where the particular HSS is identified using the received standby database information;
receive information associated with the particular UE from the particular HSS; and
register the particular UE with the MME device based on the information received from the particular HSS.

16. The MME device of claim 15, where the standby database information includes one or more of:
a Globally Unique Temporary Identifier (GUTI) that associates the particular UE with a particular MME device;
a Tracking Area Code (TAC) that associates the particular UE with one or more base stations;
an International Mobile Subscriber Identity (IMSI) that identifies the particular UE within a network associated with the MME device;
security information associated with the particular UE;
an indication of whether the particular UE is a special service UE;
a serving Home Subscriber Server (HSS) associated with the particular UE; or
quality of service (QoS) requirements associated with the particular UE.

17. The MME device of claim 15, where the processor is further to:
receive, at particular intervals, a heartbeat message from the other MME device, where receipt of the heartbeat message indicates that the other MME device is functioning properly; and
detect that the other MME device has failed or lost connectivity based on detecting that a heartbeat message was not received from the other MME device within a particular time period.

18. The MME device of claim 15, where the processor is further to:
inform a serving gateway (SGW) associated with the particular UE, that the particular UE is to be associated with the MME device.

19. The MME device of claim 15, where the processor is further to:
send, at particular intervals, a heartbeat message to other MME devices in the network;
send, at particular intervals, a heartbeat message to at least one serving gateway (SGW) in the network.

20. One or more computer-readable physical memory devices storing instructions executable by one or more processors, the one or more computer-readable memory devices comprising:
one or more instructions to receive, at a first mobility management entity (MME) device in a network, and from a second MME device, standby database information associated with user equipment (UE) registered with the second MME device;
one or more instructions to detect that the second MME device has failed or lost connectivity;
one or more instructions to designate that at least some of the UEs registered with the second MME device will be registered with the first MME device, in response to detecting that the second MME device has failed or lost connectivity;
one or more instructions to detect a request to activate a particular UE of the at least some of the UEs registered with the second MME device; and
one or more instructions to request the particular UE, using the standby database information received from the second MME device, to register with the first MME device, in response to detecting the request to activate the particular UE.

* * * * *